April 25, 1967 H. WEYERS 3,315,384
DEVICE FOR DIGGING TRENCHES AND PITS
Filed July 8, 1964 2 Sheets-Sheet 1

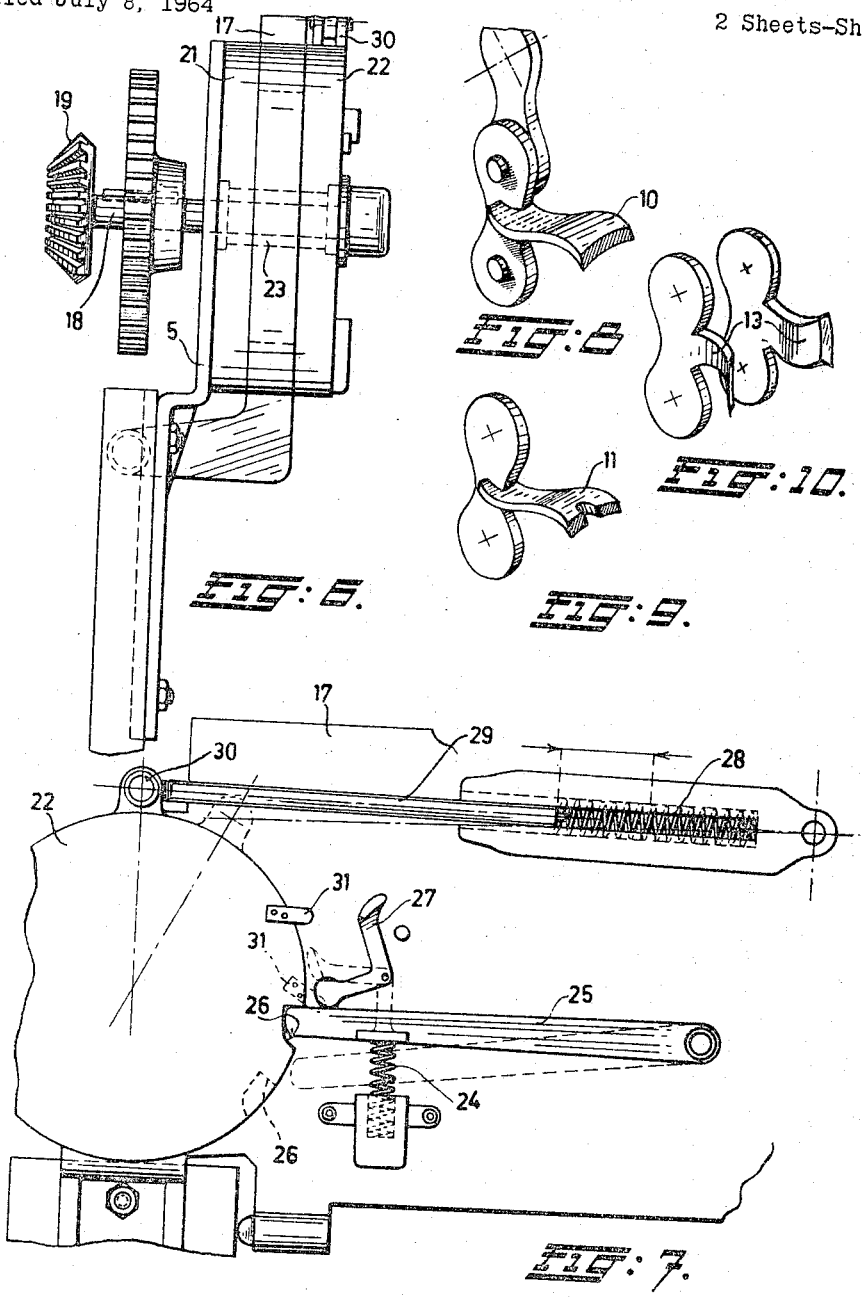

United States Patent Office 3,315,384
Patented Apr. 25, 1967

3,315,384
DEVICE FOR DIGGING TRENCHES AND PITS
Heinrich Weyers, Pater Eijmardstraat 1,
Stevensbeek, Netherlands
Filed July 8, 1964, Ser. No. 381,119
Claims priority, application Netherlands, July 12, 1963,
295,265
7 Claims. (Cl. 37—191)

The invention relates to a device for digging trenches, which device consists of a digging element, which can be hingedly secured to an adjustable tractor arm and which can be driven by and operated from the tractor, and which comprises an endless chain, running over two sprockets or gear wheels, and being provided with members for taking away the soil, the chain being stretched by means of at least one compression spring which acts between the gear wheels.

Such digging devices are known in various embodiments for digging narrow or wide trenches or pits. Generally they are only adapted for digging in pretty loose soil, such as for laying drain tubes in lawns.

The principal object of the present invention is to provide a digging device, which is suitable for making drainage trenches in ground which, at a certain distance below the surface, presents a hard impermeable layer. In such ground the water cannot, or can only slowly percolate or sink away, with the result that the surface layer will become wet or even marshy, and the ground will acidify.

Another object is to provide a device for the purpose mentioned, which requires only a relatively small driving power, and which can, consequently, be of light construction. The manner in which these and other objects are accomplished will be apparent from the following description which is to be read in connection with the accompanying drawings, wherein:

FIGURE 6 shows an enlarged side elevational view of the upper portion of the digging element, in which is accommodated the drive and the coupling mechanism;

FIGURE 7 shows a side elevational view of the coupling mechanism;

FIGURE 8 is a perspective view of an inner link and an outer link of the chain with a scraping-conveying member on the latter;

FIGURE 9 is a perspective view of an outer link with a scraping-conveying member having a notched chisel edge thereon; and FIGURE 10 is a perspective view of an outer link with a loosening member thereon.

Figure 1:
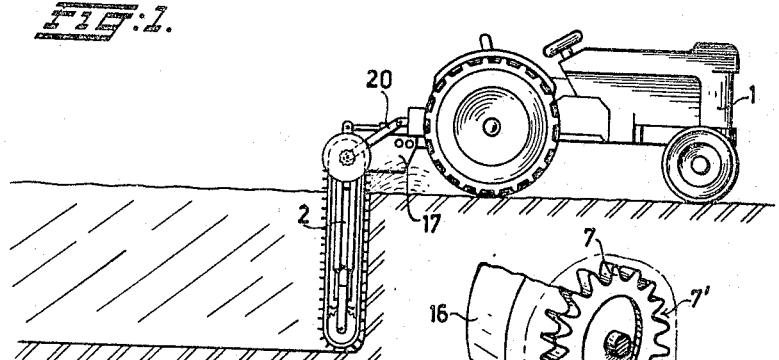
FIGURE 1 shows in outline a digging element connected with a tractor.

In FIGURE 1 a tractor is denoted by the reference numeral 1 and the digging element by 2. The latter comprises a chain 3 running over a frame 4 which includes upper and lower end plates 5 and 6 rotatably supporting gear wheels or sprockets 7 and 8, respectively. The gear wheels 7 and 8 and the frame 4 are substantially situated in one plane.

Figure 2:
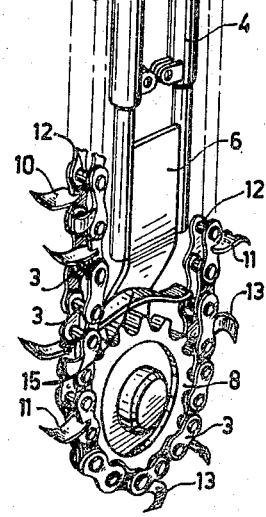
FIGURE 2 is a perspective view of the digging element.

The frame 4 is further constituted by a pair of telescoping tube assemblies which are held in parallel spaced relation by the end plates 5 and 6 and which accommodate compression springs 9 (FIG. 2).

Links of the chain 3 carry a plurality of scrapping members, like 10 and 11, which are shown in greater detail on FIGS. 8 and 9. Such scraping members extend substantially perpendicular to the longitudinal direction of the chain 3, and have their ends shaped to form chisel edges which are substantially parallel to the bolts 12 by which the links of the chain are connected. Such scraping members are secured alternately to links at the opposite sides of the chain. The members 10 and 11 may be somewhat asymmetric, and the best effect in digging is obtained when the working edges, as seen in the direction of motion, overlap partially. The scraping members 10 and 11 also function as conveying means, because of their substantially flat, horizontally extending shape, for transporting the cut or scraped material in an upward direction.

The efficiency of the action of the scraping-conveying members 10 and 11 is enhanced when some of them have their chisel edge provided with an approximately centrally situated notch, as is shown in FIG. 9. Such a notch ensures that root portions of bushes and plants in the soil and like obstacles to digging can be seized and removed.

For severing such root portions and also for cutting in and defining the region of soil which is to be removed, loosening members 13, which are shown in detail in FIG. 10, are provided. The bases of the members 13 are substantially situated in the planes of the associated outer links of the chain 3, and they flare or are bent outwardly from such bases and have the sides turned towards the direction of motion shaped again as chisel edges. The members 13 are arranged on the chain between scraping-conveying members 10 and 11, and also are alternately disposed at the opposite sides of the chain. Thus, the total width of the trench to be dug is divided into four partially overlapping sections, two of which sections are dug by left and right scraping-conveying members and the remaining two sections being cut by left and right loosening members, with a plurality of each type of the members 10, 11 and 13 being arranged along the length of the chain.

By reason of the above arrangement, when the members for taking away the soil meet a higher resistance—for example, in the form of a deep hard ground layer or in the form of any other obstacle in the ground—the power of the engine is not dissipated by gripping and cutting the obstacle over the entire width of the trench to be dug. On the contrary the full engine power is concentrated on one scraping element, which is operative over only a part of the trench width. The remaining portion of the obstacle as far as it has to be taken away within the trench width, is then acted upon by the next scraping element which is placed at the other side of the chain, and to which the entire engine power may then be concentrated as the first mentioned element is then operating a little higher where, in general, the loose ground will again be encountered.

As has been mentioned, loosening members 13 are provided, alternately left and right, in the intervals between the scraping members. They function so as to cut the obstacles at the sides of the trench, so that at these locations the portion of the obstacles which must be taken away need not be severed from the portion which remains in the ground by simple breaking under the influence of the scraping members 10 and 11.

Thus, according to the invention, the portion of any obstacle which is located at the place where a trench is to be dug, is attacked at several places and successively.

It is to be noted that it is an essential feature of the invention that the above mentioned arrangement of the ground treating members is employed in a digging device of the type in which the chain is stretched by means of a compression spring means acting between the sprocket wheels guiding the chain. Not all of the known digging machines are constructed in this way. The function of the said spring means is to tension the chain in such manner that, in the event of an increased resistance to digging, the connection between the sprocket wheels is contracted a small distance, whereby forces are accumulated in the compression spring means, which forces are released again when subsequently the compression spring means is relieved. During compression the force with which the scraping members act upon the hard ground portions is increased to better overcome the resistance forces. This means that the required capacity of the driving engine need not be adapted to the highest resistance of obstacles which is to be expected; and that the driving engine may have a capacity that is only adapted to a certain average resistance.

The possibility of reducing the engine capacity must be considered as being advantageous. As was said, digging devices in accordance with this invention are particularly adapted for use on ground having a tendency to be wet, because of the deep hard layer which prevents the water from sinking. Is is in practice almost impossible to dig trenches in such ground with a heavy engine, having a power sufficient to overcome the maximum occurring resistance, because such a heavy engine will cause the digging device to sink in the wet ground. Thus, the possibility of reducing the engine capacity and weight ensures that the digging device in accordance with the invention will not sink even when used on wet or marshy terrain.

In known devices the digging chain is supported by a simple bar-like boom, consisting of two telescoping portions. However, in the device according to the invention, the reactions to the forces applied by the scraping and loosening members will substantially alternately occur at the left and right sides of the chain; so that these forces will not always lie in the plane of the two sprocket wheels. The result would be wrenching or twisting of the boom, with the consequence that the chain and the scraping and loosening members would tend to grip the sides of the trench portion which is already dug. It will be clear that this would cause loss of power. It is therefore advantageous to use a frame for the digging device as described, in which the gear wheels are supported by a frame 4 which comprises at least two telescoping tube assemblies held in spaced parallel relation by the end plates 5 and 6. Such a frame will have a much greater rigidity than the simple booms heretofor known, so that the above mentioned loss of power by wrenching or twisting will be substantially avoided.

The number of loosening members 13 and the number of scraping-conveying members 10 and 11 may be in the ratio 2:3. Obviously this ratio should be changed to increase the relative number of the loosening members 13 when trenches are dug in hard soils like gravel loam.

The chisel-like edges of the loosening members 13 and scraping-conveying members 10 and 11 may have a length of about 20 mm. Since the various members 10, 11 and 13 protrude beyond the sides of the chain, but on the other hand partially overlap, there is achieved a total digging width of about 55 mm. This digging width is adequate for trenches in which normal drain tubes have to be installed. When a greater width is required, it is desirable to use two or more digging elements 2 arranged side by side and coupled to the drive 1.

Figure 4:
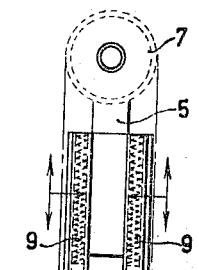
FIGURE 4 is a cross section on an enlarged scale taken along the line IV—IV on FIG. 3.

Provided between the chain 3 and the frame 4 (FIG. 4) and secured to the upper parts of the tube assemblies of the frame are reinforcement ribs 14 of square cross section which ensure that the tubes of the frame 4 are not damaged by the chain 3 striking thereagainst. This striking of the chain 3 is caused by the telescoping action of the tube assemblies which is opposed by the compression of springs 9, whereby tension in the chain 3 is alternately increased or decreased. The contact face between chain and reinforcement rib 14 has a width which is slightly less than the length of the link bolts 12, the reinforcement rib 14 being secured to the respective tube in such manner that the links of the chain 3 embrace the sides of the reinforcement rib 14. In a test model according to the invention an engine with a capacity of 1½ H.P. has been used for driving the digging element through a reduction gearing having a ratio of 1:6, and such device has been capable of digging a trench having a width of substantially 5.5 cm. and a depth of substantially 80 cm. at the rate of 10 meters of length of such trench per minute.

Figures 3, 5:
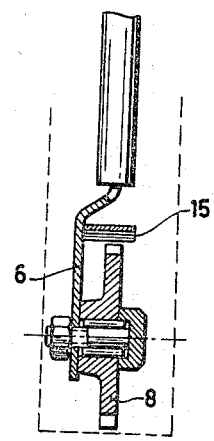
FIGURE 3 is a side elevational view of the digging element in which the chain and sprockets have been omitted for the sake of clarity.
FIGURE 5 is an enlarged detail view of the lower portion of the digging element of FIG. 3 and which appears partly in section and partly in side elevation as viewed in the direction of the arrow II on FIG. 3.

In order to protect the sprocket wheels, the end plates 5 and 6 are offset (FIGS. 5 and 6) so as to constitute a screen between the tube pieces of the frame 4 and the sprocket wheels. Further, a shield 15 (FIGS. 3 and 5) projects laterally from plate 6 above wheel 8 so that the spaces between the teeth of the sprocket wheel will not be filled by loosened soil.

In order to ensure that the material, which is upwardly conveyed at a high speed, does not fall back in the trench there is provided a laterally bent screen 16 on the upper part of the digging element 2 (FIG. 2).

The digging element 2 is connected with the tractor 1 in such manner that on digging (see FIG. 1) the said element 2 is substantially at right angles with the land level.

In order to prevent damage to the digging element 2 when great resistance to digging is encountered, there is provided a coupling mechanism (FIGS. 6 and 7), which ensures that in the event of such great resistance the digging element is displaced from its operative vertical position and thus frees itself from the earth to be removed. The operation of the said mechanism is as follows:

Connected with the tractor is an adjustable plate 17 in which is supported a shaft 18 having a crown wheel 19 secured thereon and driven from the take-off shaft 20 (FIG. 1) of the tractor 1. The upper sprocket wheel 7 of the digging element 2 is further secured on this shaft 18.

On either side of the plate 17 are two rotatable discs 21 and 22, which are mutually coupled by the sleeve 23, the latter constituting also a further bearing for the shaft 18. A plate 5 which is secured so as to be stationary in respect to the disc 21, bears the digging element 2 proper. The disc 22 is kept in position by the catch 25 which engages in a notch 26 in disc 22 and is under the influence of the compression spring 24. When the resistance in the soil becomes too great and there is the risk of damage to the loosening and scraping-conveying members, the digging element 2 is slightly pushed backwardly due to the advancing movement of the tractor, whereby the spring 24 is compressed and the catch 25 is released from the notch 26 (represented in dotted lines in FIG. 7). A pivoted tumbler 27 engages and maintains the spring 24 in its compressed condition, as soon as the tumbler arrives in the position drawn in broken lines, with the results that a draw spring 28, connected by way of a rod 29 to a lug 30 on the disc 22, can exert the full force in order to rotate the disc 22 in the direction towards the tractor, so that finally the digging element is lifted from its vertical position and its frame is extended to tension the chain 3.

When the disc 22 turns back, a cam 31 on the disc lifts the tumbler 27 from the position shown in broken lines on FIG. 7, whereby the compression spring 24 again presses the catch 25 into the notch 26.

The above described embodiment of my improved trench digging device is especially suitable for making trenches in ground having a hard, impermeable layer at some depth below the surface and which tend to be wet and marshy.

Draining such grounds by means of porous drain tubes is not always efficient, as there is a risk that drain tubes in the event of breakage or owing to other circumstances are filled with roots. Moreover, the provision of such drainage is expensive. In fact such drainage does not remove the cause of the acidification of the soil. However, with my improved digging device, one is able to make a network of small drainage trenches, which divide the hard layer into smaller pieces. Thus, the excess water can easily sink, so that the trenches dug in this way will perform their intended function for many years.

Although an illustrative embodiment has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What I claim is:

1. A device for digging trenches or pits, which device consists of a digging element, which can be hingedly secured to an adjustable arm of an engine propelled vehicle and which can be driven by and operated from said vehicle, and which comprises an endless chain having right and left links interconnected by bolts and running over two sprocket wheels, and being provided with a plurality of members for taking away the soil, said chain being stretched by means of at least one compression spring which acts between said sprocket wheels, wherein the said members for taking away the soil comprise a plurality of chisel shaped scraping-conveying members, protruding from the front side of the chain and each having a working edge which is substantially parallel to the chain bolts and a working width which is smaller than the width of the trench to be dug, said scraping-conveying members being arranged alternately at the left side and at the right side of the chain, and between the said scraping-conveying members loosening members are provided, also arranged alternately at the right and at the left sides of the chain, which determine at least the sides of the trench to be dug.

2. A device as claimed in claim 1, wherein the sprocket wheels are supported by a frame, which comprises at least two telescoping tube assemblies held in spaced, parallel relation by means of connecting members.

3. A device as claimed in claim 1, wherein said working edges of at least certain of the chisel-shaped scraping conveying members are each provided with an approximately centrally situated notch.

4. A device as claimed in claim 1, wherein the loosening members have bases situated in the planes of the chain links to which they are connected and are bent outwardly from said bases, said loosening members having chisel-shaped edges facing in the direction of motion of the chain in order to cut the sides of the trench over a width which is greater than the width of the chain links.

5. A device as claimed in claim 1, wherein the number of loosening members and the number of scraping-conveying members are approximately in the ratio 2:3.

6. A device as claimed in claim 1, wherein said chisel-shaped edges of the loosening and scraping-conveying members each have a length of about 20 mm., and the loosening and the scraping-conveying members are arranged on said chain so that said edges overlap laterally in such a way that a total digging width of about 5 cm. is achieved.

7. A device as claimed in claim 2, wherein guide ribs are provided between the chain and at least the outer tubes of said tube assemblies of the frame, the said ribs being secured to said tube and fitting with clearance between the right and left links of the chain.

References Cited by the Examiner

UNITED STATES PATENTS

| | | | |
|---|---|---|---|
| 1,078,871 | 11/1913 | Olson | 172—269 |
| 2,519,075 | 8/1950 | Schmidt | 37—86 |
| 2,777,219 | 1/1957 | Brant | 37—86 |
| 2,826,837 | 3/1958 | Laue | 37—86 |
| 3,024,546 | 3/1962 | Cramer | 37—86 |
| 3,028,693 | 4/1962 | Malzahn | 37—86 |
| 3,054,198 | 9/1962 | George et al. | 37—191 X |
| 3,130,506 | 4/1964 | Laster | 37—86 |

ABRAHAM G. STONE, *Primary Examiner.*

J. R. OAKS, *Assistant Examiner.*